(12) United States Patent
Kuo

(10) Patent No.: US 8,804,633 B2
(45) Date of Patent: Aug. 12, 2014

(54) METHOD AND APPARATUS TO TRIGGER A RANDOM ACCESS PROCEDURE FOR CARRIER AGGREGATION IN A WIRELESS COMMUNICATION NETWORK

(75) Inventor: Richard Lee-Chee Kuo, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 827 days.

(21) Appl. No.: 12/939,810

(22) Filed: Nov. 4, 2010

(65) Prior Publication Data

US 2011/0103332 A1 May 5, 2011

Related U.S. Application Data

(60) Provisional application No. 61/258,202, filed on Nov. 5, 2009, provisional application No. 61/312,669, filed on Mar. 11, 2010.

(51) Int. Cl.
*H04W 4/00* (2009.01)
(52) U.S. Cl.
USPC .......................................................... 370/329
(58) Field of Classification Search
USPC .......................................................... 370/329
See application file for complete search history.

(56) References Cited

U.S. PATENT DOCUMENTS

2012/0113939 A1* 5/2012 Kim et al. ..................... 370/329

OTHER PUBLICATIONS

Nokia Corporation et al: "RACH and carrier aggregation", 3GPP TSG-RAN WG2 Meeting #67bis, Miyazaki, Japan, Oct. 12-16, 2009 (R2-095898).
3GPP TSG WG2 Meeting #67bis, Miyazaki, Japan, Oct. 12-16, 2009 (R2-095422).
HUAWEI: "Different Timing Advance Impact on Carrier Aagregation", 3GPP TSG-RAN WG2 Meeting #67bis, Miyazaki, Japan, Oct. 12-16, 2009 (R2-095815).
Search Report on corresponding foreign application (EP 10014343.7) from the EPO dated Aug. 11, 2011.

* cited by examiner

*Primary Examiner* — Shripal Khajuria
(74) *Attorney, Agent, or Firm* — Blue Capital Law Firm, P.C.

(57) ABSTRACT

A method and apparatus for a base station to trigger a random access procedure for carrier aggregation in a wireless communication system are disclosed. The method includes sending a dedicated radio resource control signal to configure a user equipment with a plurality of secondary component carriers (SCCs) that include uplink SCCs and/or downlink SCCs for carrier aggregation. The method further includes sending an activation signal to the user equipment to activate a configured downlink SCC. The method also includes transmitting a physical downlink control channel order only on the downlink primary CC to trigger a random access procedure.

20 Claims, 5 Drawing Sheets

METHOD AND APPARATUS TO TRIGGER A RANDOM ACCESS PROCEDURE FOR CARRIER AGGREGATION IN A WIRELESS COMMUNICATION NETWORK

CROSS-REFERENCE TO RELATED APPLICATIONS

The present Application for Patent claims the benefit of U.S. Provisional Patent Application Ser. No. 61/258,202, filed on Nov. 5, 2009, entitled "Method and Apparatus of Random Access Procedure and HARQ Feedback for Carrier Aggregation in a Wireless Communication System" and U.S. Provisional Patent Application Ser. No. 61/312,669, filed on Mar. 10, 2010, entitled "Method and Apparatus of PUCCH Release and PDCCH Order in a Wireless Communication System".

FIELD

This disclosure relates generally to a method and apparatus to trigger a random access procedure for carrier aggregation in a wireless communication network.

BACKGROUND

In a typical wireless communication network utilizing the 3GPP or 3GPP2 protocol standards, a PDCCH order sent from an Evolved Node B (eNode B) is used to trigger a random access (RA) procedure in a user equipment (UE) to obtain or update the timing advance needed for uplink transmissions. When multiple component carriers (CCs) are configured to a UE, separate timing advances may be needed for different groups of uplink CCs. Therefore, what is needed is a method and apparatus to efficiently trigger the necessary random access procedure.

SUMMARY

A method and apparatus for a base station to trigger a random access procedure for carrier aggregation in a wireless communication system are disclosed. The method includes sending a dedicated radio resource control (RRC) signal to configure a user equipment (UE) with a plurality of secondary component carriers (SCCs) that include uplink (UL) SCCs and/or downlink SCCs for carrier aggregation (CA). The method further includes sending an activation signal to the UE to activate a configured downlink SCC. The method also includes transmitting a physical downlink control channel (PDCCH) order only on the downlink primary component carrier (PCC) to trigger a random access (RA) procedure.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP2 UMB (Ultra Mobile Broadband), WiMax, or some other modulation techniques.

In particular, The exemplary wireless communication systems devices described below may be designed to support one or more standards such as the standard offered by a consortium named "3rd Generation Partnership Project" referred to herein as 3GPP, including Document Nos. 3GPP TR 36.814 ("Further Advancements for E-UTRA Physical Layer Aspects (Release 9)"), 3GPP TSG-RAN WG2 R2-095808 ("Activation and Deactivation of Component Carriers"), 3GPP TSG-RAN WG2 R2-095898 ("RACH and carrier aggregation"), 3GPP TSG-RAN WG2 R2-101846 ("Stage 2 description of Carrier Aggregation"), and 3GPP TS 36.321-860 ("Evolved Universal Terrestrial Radio Access (E-UTRA) Medium Access Control (MAC) Protocol Specification (Release 8)"). The standards and documents listed above are hereby expressly incorporated herein.

Figure 1:
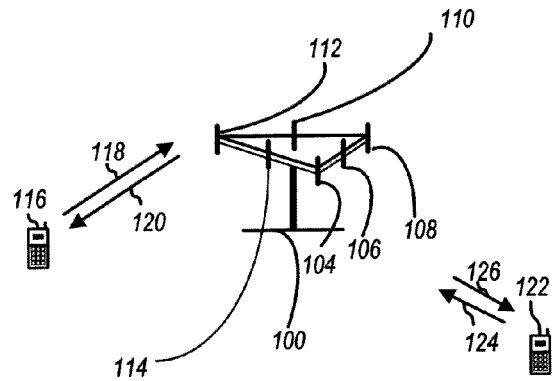
FIG. 1 shows a multiple access wireless communication system according to one embodiment of the invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 utilize beamforming in order to improve the signal-to-noise ratio of forward links for the different access terminals 116 and 124. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
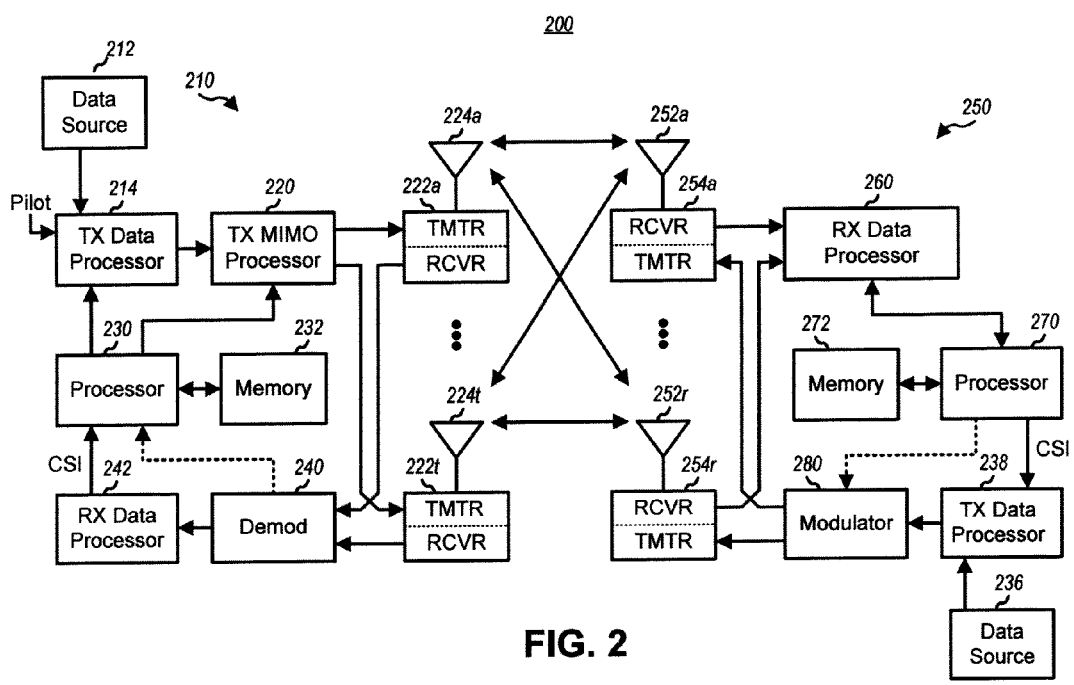
FIG. 2 is a block diagram of an embodiment of a transmitter system (also known as the access network (AN)) and a receiver system (also known as access terminal (AT) or user equipment (UE)) according to one embodiment of the invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
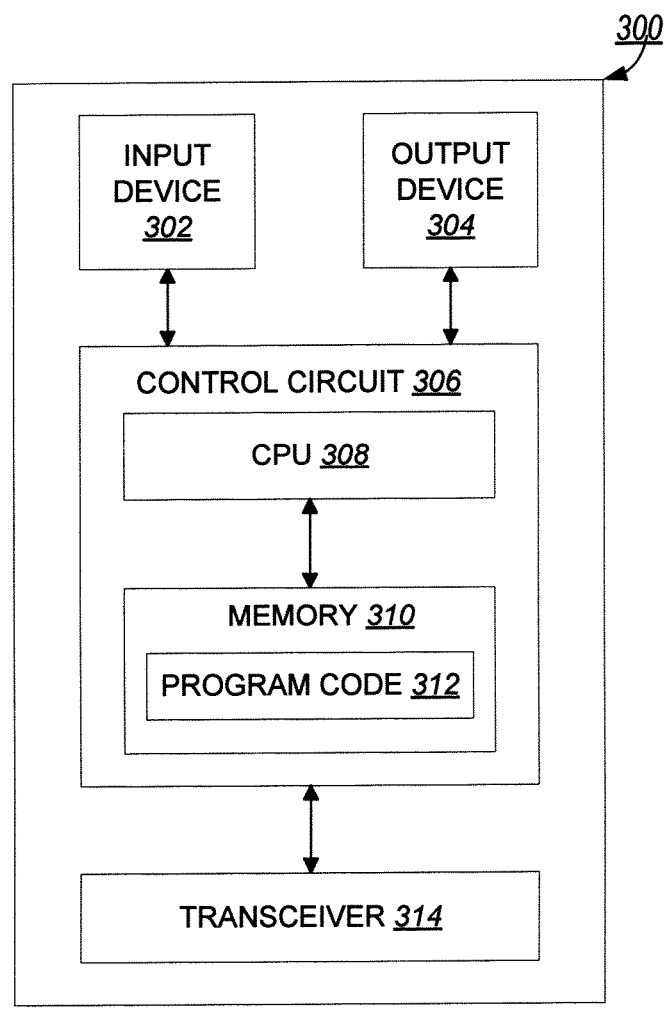
FIG. 3 shows an alternative functional block diagram of a communication device according to one embodiment of the invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 106 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
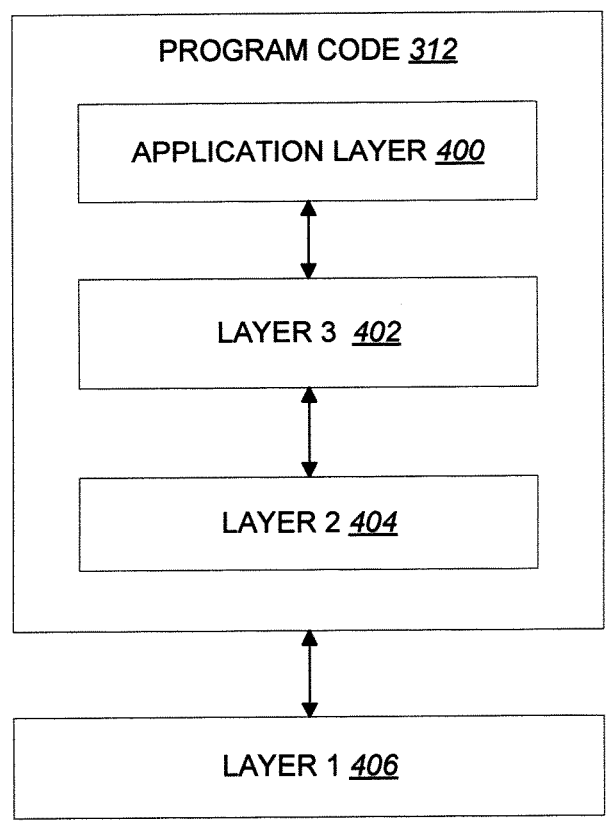
FIG. 4 is a simplified block diagram of the program code shown in FIG. 3 according to one embodiment of the invention.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 406 generally performs link control. The Layer 1 portion 408 generally performs physical connections.

In the following discussion, the invention will be described mainly in the context of the 3GPP architecture reference model. However, it is understood that with the disclosed information, one skilled in the art could easily adapt for use and implement aspects of the invention in a 3GPP2 network architecture as well as in other network architectures.

As described in 3GPP TR 36.814 Release 9, carrier aggregation, where two or more component carriers are aggregated, is supported in order to support wider transmission bandwidths. A terminal may simultaneously receive or transmit on one or multiple component carriers depending on its capabilities. For example, an LTE-Advanced terminal with reception and/or transmission capabilities for carrier aggregation can simultaneously receive and/or transmit on multiple component carriers (CC). As another example, an LTE terminal can receive and transmit on a single component carrier, provided that the structure of the component carrier follows the specifications. Furthermore, it is possible to configure a UE to aggregate a different number of component carriers of possibly different bandwidths in the uplink (UL) and the downlink (DL).

In addition, from a UE perspective, there is one transport block (in absence of spatial multiplexing) and one hybrid-ARQ entity per scheduled component carrier. Each transport block is mapped to a single component carrier. A UE may be scheduled over multiple component carriers simultaneously. The design principles for downlink control signaling of control region size and uplink and downlink resource assignments can generally be described as following: (1) PDCCH (Physical Downlink Control Channel) on a component carrier assigns PDSCH (Physical Downlink Shared Channel) resources on the same component carrier and PUSCH (Physical Downlink Shared Channel) resources on a single linked UL component carrier, (2) PDCCH on a component carrier can assign PDSCH or PUSCH resources for one of multiple component carriers.

As proposed in 3GPP TSG-RAN WG2 R2-095808, for UEs in a Radio Resource Control (RRC) connected mode, additional component carriers could be configured using dedicated RRC signals. According to 3GPP TSG-RAN WG2 R2-101846, there are two types of CC i.e. primary CC (PCC) and secondary CC (SCC). The UL PCC and the DL PCC correspond to the serving cell with which a UE establishes or re-establishes an RRC connection. Also, the NAS (Non-Access Stratum) mobility information is taken from this serving cell. In addition, only an SCC can be added or removed.

Also as proposed in 3GPP TSG-RAN WG2 R2-101846, the enhanced base station (or Evolved NodeB—eNodeB) could use a Medium Access Control (MAC) signaling to activate or deactivate a configured DL SCC for UE power saving purposes. But, the DL PCC is considered as always activated and cannot be deactivated. Furthermore, when the enhanced base station (or eNodeB) activates a carrier, it typically means that the enhanced base station (or eNodeB) is ready to allocate resources on the carrier for the UE. Therefore, it could be expected that a UE needs to initiate a random access (RA) procedure on the activated carrier to obtain the timing advance (TA) to enable related uplink transmissions in the event that separate TAs for different uplink component carriers or CC groups are required. However, it is also possible that a wireless communication system may be deployed with only uplink CCs sharing the same TA.

As proposed in 3GPP TSG-RAN WG2 R2-095898, when a UE is allocated more than one UL CC for carrier aggregation, there may be more than one BACH (Random Access Channel) potentially available for the UE. Each UL CC that the UE is assigned could support a RACH. Where there are an asymmetric UL and DL numbers of carriers (e.g. two DL CC paired to one UL CC), the UE could be assigned two sets of RACH parameters on the UL CC when the RACH for each DL CC is mapped to the same UL CC by way of partitioning (e.g., by time partitioning). It is assumed that, if RACH resources on an UL CC are partitioned between two or more DL CCs, the RACH resources are seen as separate RACH entities by the UE. Furthermore, if a UE is assigned (groups of) UL CCs that have independent timing advance, it may be necessary that the UE must be assigned and able to support at least one RACH for each timing advance group in order to be able to implement timing correction via PDCCH order. The UE MAC must be able to distinguish between PDCCH orders signaled for each RACH and apply the timing advance to the UL CCs that are associated with that particular timing advance.

In the current LTE MAC specification, a PDCCH order is used by an eNodeB to trigger a random access procedure in a UE for obtaining or updating TA. Reusing the PDCCH order to trigger a random access procedure on an activated component carrier in a UE would require a new field in the PDCCH order to indicate the concerned component carrier, which induces additional changes to the current specifications. U.S. patent application Ser. No. 12/939,501 (entitled "Method and Apparatus to Activate Component Carriers in a Wireless Communication System", and filed on Nov. 4, 2010) discloses a method and apparatus to avoid the specification changes to the PDCCH order. That disclosed method and apparatus will be integrated into this disclosure and invention herein. In addition, as described in 3GPP TS 36.321-860, a PDCCH order with a dedicated preamble can be used to force a UE to perform a RA procedure to update the TA even when a TA timer corresponding to the current DL data transmission assignment is still running.

It is possible to simplify the handling of the PDCCH order. If the PDCCH order does not need to be changed for the UE to perform a RA procedure to update the TA, the eNodeB would not, in principle, need to send a PDCCH order upon DL data arrival if there is any TA timer running. The eNodeB could just schedule the DL assignments on the available component carrier(s). In most cases, a PDCCH order would be transmitted after all TA timer expires. Furthermore, most of the component carriers should have been deactivated either explicitly or implicitly after a relatively long period of inactivity, which can be detected with a timer. As such, it is likely that there will be no other active DL component carrier except the DL PCC when a PDCCH order needs to be sent due to DL data arrival. Therefore, the issued PDCCH order could just be used to trigger a RA procedure to update the TA of the serving cell corresponding to the DL PCC. In other words, a PDCCH order to trigger a random access procedure on other SCCs is not needed.

Figure 5:
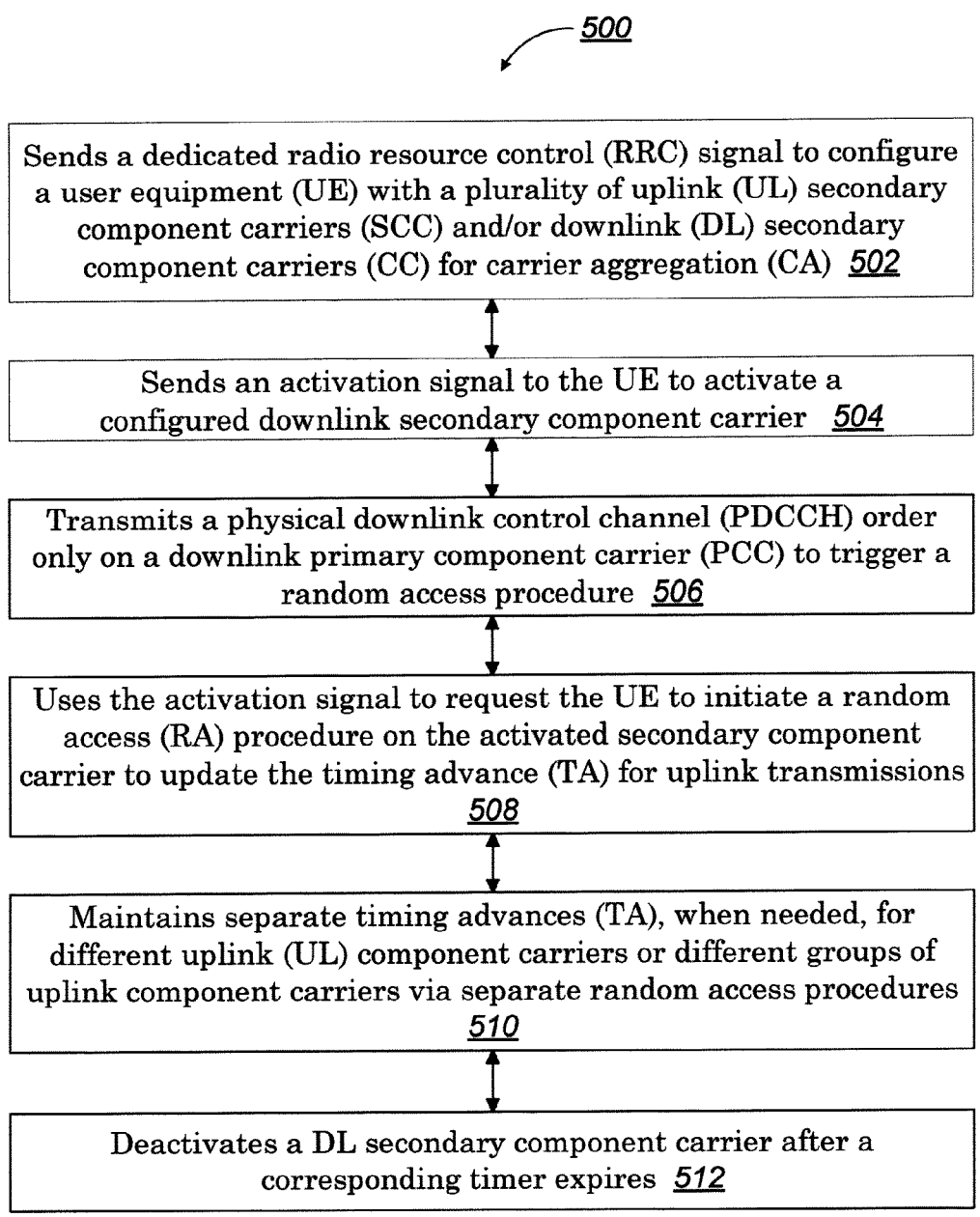
FIG. 5 outlines an exemplary flow diagram from the perspective of a base station to simplify the handling of the physical downlink control channel (PDCCH) order according to one embodiment of the invention.

Turning now to FIG. 5, this figure outlines an exemplary flow diagram 500, from the perspective of a base station (or an enhanced base station or an eNodeB), for triggering a random access procedure for carrier aggregation according to one embodiment of the invention to simplify the handling of the PDCCH order as discussed above. In step 502, a dedicated radio resource control (RRC) signal is sent to configure the UE with one or more secondary component carriers for carrier aggregation. The component carriers can include an uplink (UL) secondary component carrier and/or a downlink (DL) secondary component carrier. In one embodiment, the dedicated radio resource control (RRC) signal can be the RRC connection reconfiguration message. In step 504, an activation signal is sent to the UE to activate a configured DL secondary component carrier. In one embodiment, the activation signal can be an MAC signal. In step 506, a PDCCH order is transmitted only on the DL PCC to trigger a random access procedure. In one embodiment, the DL PCC is considered as always activated. In step 508, the activation signal is used to request the UE to initiate a random access (RA) procedure on the activated secondary component carrier to update the timing advance (TA) for uplink transmissions. In step 510, separate timing advances may be required and maintained for different UL component carriers or different groups of UL component carriers. In step 512, a downlink secondary component carrier is deactivated when a corresponding timer expires. As the component carriers would have been deactivated after a relatively long period of inactivity, it is likely that there will be no other active DL component carrier except the DL PCC when a PDCCH order needs to be sent due to DL data arrival. In one embodiment, the UL PCC and the DL PCC correspond to the serving cell with which a UE establishes or re-establishes an RRC connection.

Figure 6:
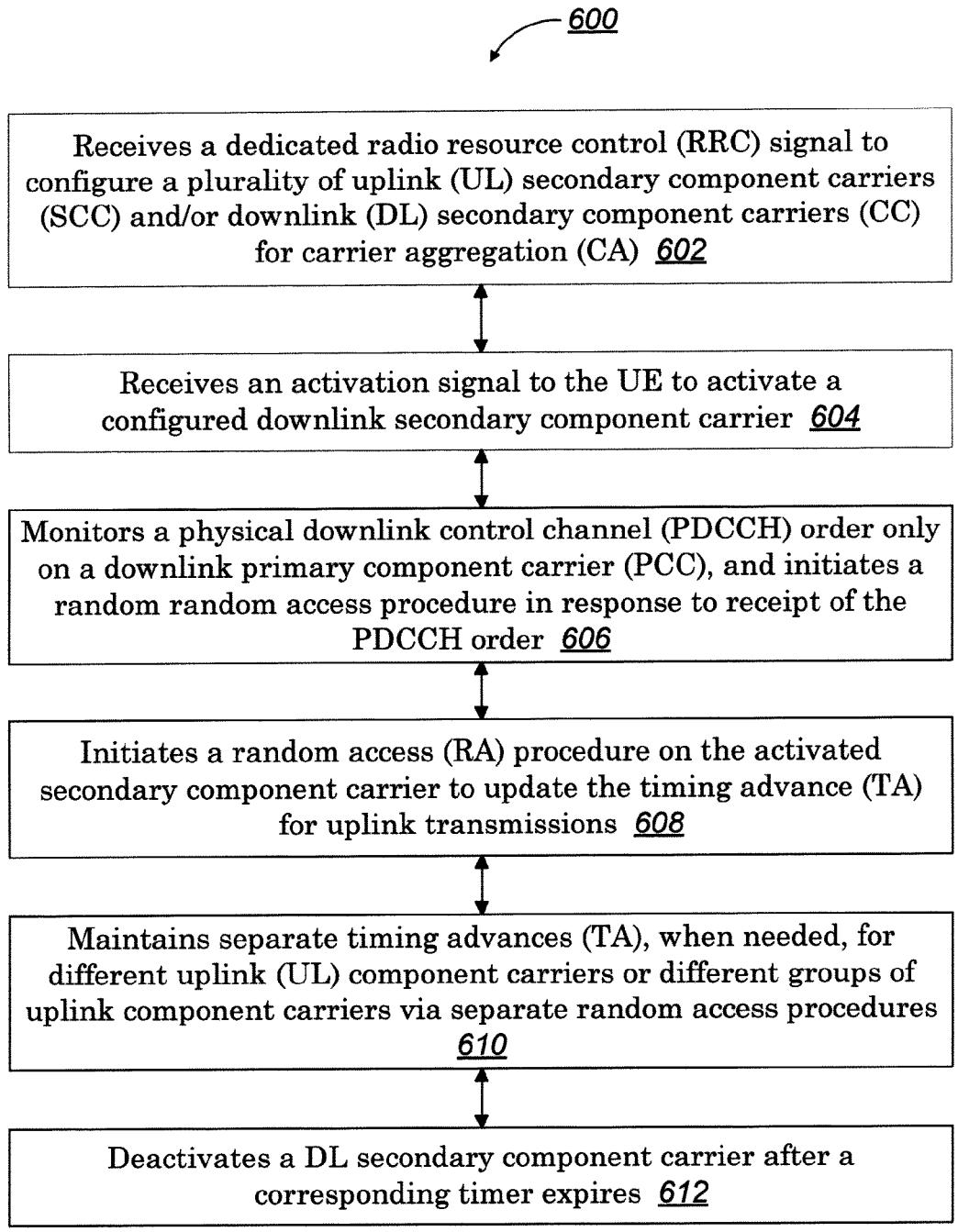
FIG. 6 outlines an exemplary flow diagram from the perspective of a user equipment to simplify the handling of the physical downlink control channel (PDCCH) order according to one embodiment of the invention.

Turning now to FIG. 6, this figure outlines an exemplary flow diagram 600, from the perspective of a user equipment, to simplify the handling of the PDCCH order as discussed above. In step 602, a dedicated radio resource control (RRC) signal is received to configure a plurality of secondary component carriers (SCCs). The component carriers can include an uplink (UL) secondary component carrier and/or a downlink (DL) secondary component carrier. In one embodiment, the dedicated radio resource control (RRC) signal can be the RRC connection reconfiguration message as discussed above. In step 604, an activation signal is received to activate a configured DL secondary component carrier. In one embodiment, the activation signal can be an MAC signal as described above. In step 606, a PDCCH order is monitored only on the DL PCC. In response to receipt of the PDCCH order, a random access procedure is initiated. In one embodiment, the DL PCC is considered as always activated.

In step 608, upon receipt of the activation signal, random access procedure is initiated on the activated SCC to update the timing advance for uplink transmissions. In step 610, separate timing advances may be required and maintained for different UL component carriers or different groups of UL component carriers. In step 612, a downlink secondary component carrier is deactivated when a corresponding timer expires. As discussed above, the UL PCC and the DL PCC correspond to the serving cell with which a UE establishes or re-establishes an RRC connection in one embodiment.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a base station to trigger a random access procedure for carrier aggregation in a wireless communication system, comprising:
   sending a dedicated radio resource control (RRC) signal to configure a user equipment (UE) with a plurality of secondary component carriers (SCCs) that include uplink SCCs and/or downlink SCCs for carrier aggregation;
   sending an activation signal to the UE to activate a configured downlink SCC; and
   transmitting a physical downlink control channel (PDCCH) order only on a downlink primary component carrier (PCC) to trigger a random access procedure, wherein the downlink PCC is considered as always activated.

2. The method of claim 1, further comprises:
   using the activation signal to request the UE to initiate a random access procedure on the activated SCC to update a timing advance for uplink transmissions.

3. The method of claim 1, further comprises:
   maintaining separate timing advances (TAs) for different groups of uplink CCs via separate random access procedures.

4. The method of claim 1, further comprises:
   deactivating a downlink SCC when a corresponding timer expires.

5. The method of claim 1, wherein the uplink PCC and the downlink PCC correspond to a serving cell with which a UE establishes or re-establishes an RRC connection.

6. The method of claim 1, wherein the dedicated RRC signal is a RRC connection reconfiguration message.

7. The method of claim 1, wherein the activation signal is a Medium Access Control (MAC) signal.

8. A method for a user equipment (UE) to initiate a random access procedure for carrier aggregation in a wireless communication system, comprising:
   receiving a dedicated radio resource control (RRC) signal to configure a plurality of secondary component carriers (SCCs) that include uplink SCCs and/or downlink SCCs for carrier aggregation;
   receiving an activation signal to activate a configured downlink SCC; and
   monitoring a physical downlink control channel (PDCCH) order only on the downlink primary component carrier (PCC) and initiating a random access procedure in response to receipt of the PDCCH order, wherein the downlink PCC is considered as always activated.

9. The method of claim 8, further comprises:
   initiating a random access procedure on the activated SCC upon receipt of the activation signal to update the timing advance for uplink transmissions.

10. The method of claim 8, further comprises:
    maintaining separate timing advances (TAs) for different groups of uplink CCs via separate random access procedures.

11. The method of claim 8, further comprises:
    deactivating a downlink SCC when a corresponding timer expires.

12. The method of claim 8, wherein the uplink PCC and the downlink PCC correspond to the serving cell with which a UE establishes or re-establishes an RRC connection.

13. The method of claim 8, wherein the dedicated RRC signal is a RRC connection reconfiguration message.

14. The method of claim 8, wherein the activation signal is a Medium Access Control (MAC) signal.

15. An apparatus to initiate a random access procedure for carrier aggregation in a wireless communication system, comprising:
    a first module adapted to receive a dedicated radio resource control (RRC) signal to configure a plurality of secondary component carriers (SCCs) that include uplink SCCs and/or downlink SCCs for carrier aggregation;
    a second module adapted to receive an activation signal to activate a configured downlink SCC; and
    a third module adapted to monitor a physical downlink control channel (PDCCH) order only on the downlink primary component carrier (PCC), and to initiate a random access procedure in response to receipt of the PDCCH order, wherein the downlink PCC is considered as always activated.

16. The apparatus of claim 15, further comprises:
    a fourth module adapted to initiate a random access procedure on the activated SCC upon receipt of the activation signal to update the timing advance for uplink transmissions.

17. The apparatus of claim 15, further comprises:
    a fifth module adapted to maintain separate timing advances (TAs) for different groups of uplink CCs via separate random access procedures.

18. The apparatus of claim 15, further comprises:
    a sixth module adapted to deactivate a downlink SCC when a corresponding timer expires.

19. The apparatus of claim 8, wherein the uplink PCC and the downlink PCC correspond to the serving cell with which a UE establishes or re-establishes an RRC connection.

20. The apparatus of claim 8, wherein the activation signal is a Medium AccessControl (MAC) signal.

* * * * *